(12) United States Patent
Sander et al.

(10) Patent No.: US 12,032,487 B2
(45) Date of Patent: *Jul. 9, 2024

(54) ACCESS LOG AND ADDRESS TRANSLATION LOG FOR A PROCESSOR

(71) Applicants: ADVANCED MICRO DEVICES, INC., Santa Clara, CA (US); ATI Technologies ULC, Markham (CA)

(72) Inventors: Benjamin T. Sander, Austin, TX (US); Mark Fowler, Boxborough, MA (US); Anthony Asaro, Markham (CA); Gongxian Jeffrey Cheng, Markham (CA); Michael Mantor, Orlando, FL (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 108 days.

This patent is subject to a terminal disclaimer.

(21) Appl. No.: 17/666,974

(22) Filed: Feb. 8, 2022

(65) Prior Publication Data

US 2022/0269620 A1    Aug. 25, 2022

Related U.S. Application Data

(63) Continuation of application No. 14/747,980, filed on Jun. 23, 2015, now Pat. No. 11,288,205.

(51) Int. Cl.
G06F 12/10     (2016.01)
G06F 12/0893   (2016.01)
G06F 12/1027   (2016.01)

(52) U.S. Cl.
CPC ...... *G06F 12/1027* (2013.01); *G06F 12/0893* (2013.01); *G06F 2212/684* (2013.01)

(58) Field of Classification Search
CPC ................ G06F 12/1027; G06F 2212/684
See application file for complete search history.

(56) References Cited

U.S. PATENT DOCUMENTS

2013/0339617 A1*  12/2013  Averbouch .......... G06F 12/0862
                                                                  711/E12.07

* cited by examiner

*Primary Examiner* — Jae U Yu

(57) ABSTRACT

A processor maintains an access log indicating a stream of cache misses at a cache of the processor. In response to each of at least a subset of cache misses at the cache, the processor records a corresponding entry in the access log, indicating a physical memory address of the memory access request that resulted in the corresponding miss. In addition, the processor maintains an address translation log that indicates a mapping of physical memory addresses to virtual memory addresses. In response to an address translation (e.g., a page walk) that translates a virtual address to a physical address, the processor stores a mapping of the physical address to the corresponding virtual address at an entry of the address translation log. Software executing at the processor can use the two logs for memory management.

20 Claims, 3 Drawing Sheets

FIG. 2

| 230 PHYSICAL ADDRESS | 231 REQUEST TYPE |
|---|---|
| FA19 | READ |
| EFC3 | WRITE |

| 339 TYPE | 340 VIRTUAL ADDRESS | 341 PHYSICAL ADDRESS |
|---|---|---|
| TRANSLATION | FA19 | CD19 |
| TRANSLATION | 0032 | D632 |
| TLB INVALIDATE-PTE | FB11 | CE21 |
| TLB INVALIDATE-PTE | FF31 | XXXXXXX |
| TLB FLUSH ALL | XXXXXXX | XXXXXXX |
| TRANSLATION | FA19 | DD19 |

342, 343, 344, 345, 347, 348

ACCESS LOG AND ADDRESS TRANSLATION LOG FOR A PROCESSOR

CROSS-REFERENCE TO RELATED APPLICATIONS

The present application is a Continuation application of U.S. patent application Ser. No. 14/747,980, entitled "ACCESS LOG AND ADDRESS TRANSLATION LOG FOR A PROCESSOR", and filed on Jun. 23, 2015, the entirety of which is incorporated by reference herein.

BACKGROUND

Field of the Disclosure

The present disclosure relates generally to processors and more particularly to memory management at a processor.

Description of the Related Art

To improve processing speed and efficiency, a processor typically employs a memory hierarchy having multiple levels. Memory modules at a lower level ("closer" to one or more corresponding processor cores) in the memory hierarchy can typically be accessed more quickly by the corresponding processor cores than memory modules at a higher level. However, lower levels in the memory hierarchy typically store less data than higher levels. Accordingly, to facilitate efficient access to data, the processor implements a memory management scheme that governs the transfer of data between levels of the memory hierarchy. The goal of the memory management scheme is to move data more likely to be accessed by a processor core closer in the memory hierarchy to that processor core. However, the increasing complexity of processor designs, including the addition of graphics processing units and other specialized processing modules to the processor, has increased the difficulty in identifying the data that is more likely to be accessed.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 2 is a block diagram of the log of FIG. 1 indicating cache misses in accordance with some embodiments.

FIG. 3 is a block diagram of the log of FIG. 1 indicating virtual-to-physical address mappings in accordance with some embodiments.

DETAILED DESCRIPTION

FIGS. 1-4 illustrate techniques for maintaining, at a processor, an access log access log indicating a stream of cache misses at a cache of the processor. In response to each of at least a subset of cache misses at the cache, the processor records a corresponding entry in the access log, indicating a physical memory address of the memory access request that resulted in the corresponding miss. In addition, the processor maintains an address translation log that indicates a mapping of physical memory addresses to virtual memory addresses. In response to an address translation (e.g., a page walk) that translates a virtual address to a physical address, the processor stores a mapping of the physical address to the corresponding virtual address at an entry of the address translation log. In some embodiments, software executing at the processor uses the two logs for memory management.

To illustrate, in some scenarios a program will execute more efficiently if data likely to be frequently accessed by the program, referred to for purposes of description as "frequently used data", is stored at a cache of the processor's memory hierarchy. Frequently used data can be indicated by cache misses resulting from memory accesses requests targeting the frequently used data. Accordingly, to identify frequently used data, software executing at the processor can analyze the access log to identify repeated attempts to access regions or sets of data. However, most executing software employs virtual addresses for memory accesses while cache misses, and therefore the address information stored at the access log, are based on physical addresses. The software can use the address translation log to translate physical address information in the access log to virtual address information, facilitating analysis of the access log by the software. Based on the analysis, the software can identify one or more blocks of frequently used data and request that the data be moved closer to one or more processor cores in the processor memory hierarchy, thereby improving processing efficiency.

Figure 1:
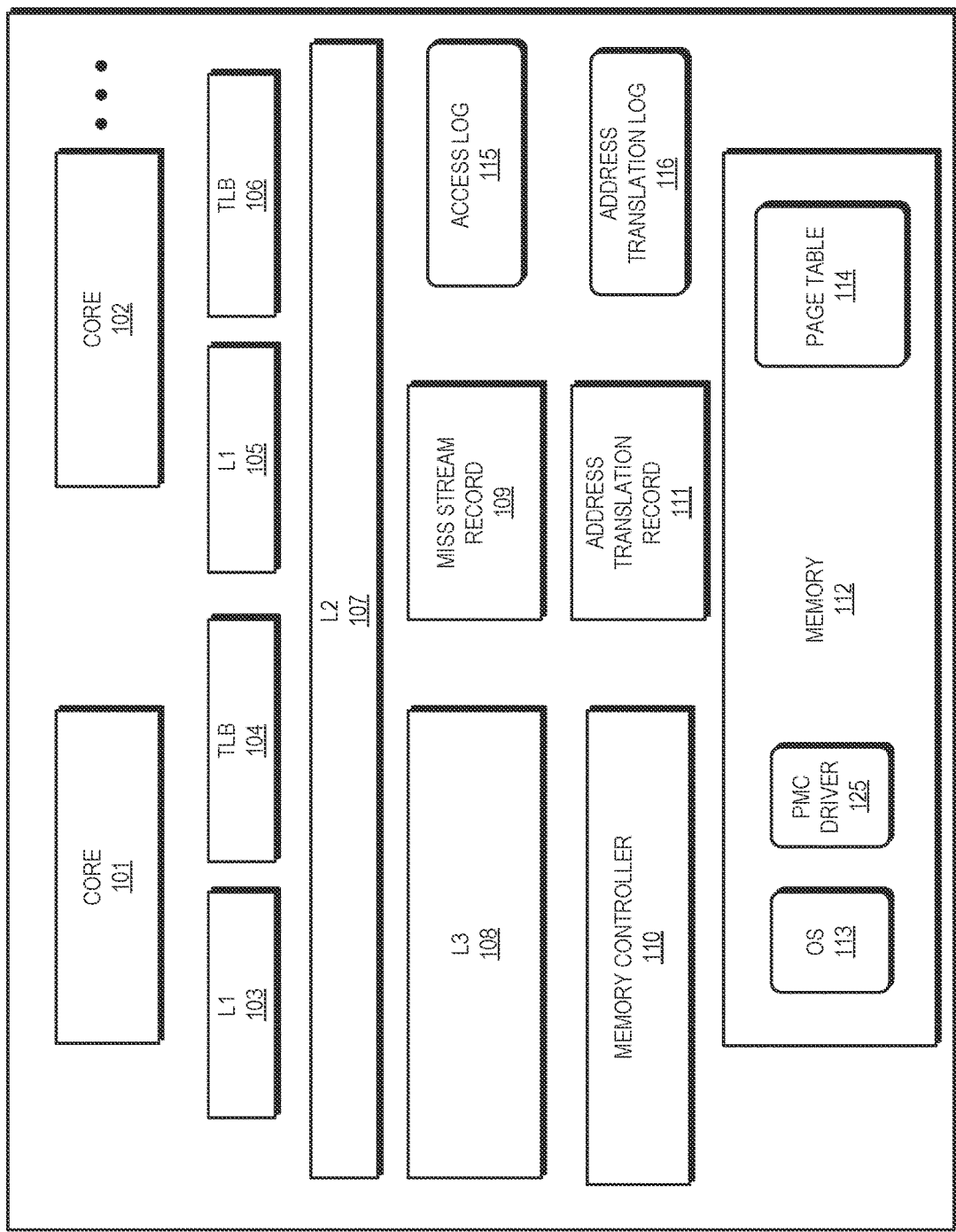
FIG. 1 is a block diagram of a processor that maintains an access log indicating cache misses and a corresponding log that indicates virtual-to-physical address mappings in order to support software memory management in accordance with some embodiments.

FIG. 1 illustrates a processor 100 in accordance with some embodiments. The processor 100 is a general purpose processor configured to execute instructions organized in the form of computer programs. Accordingly, the processor 100 can be incorporated into any of a variety of electronic devices, including a desktop computer, laptop computer, server, tablet, smartphone, gaming console, and the like. To facilitate execution of instructions, the processor 100 includes a plurality of processor cores (e.g., processor cores 101 and 102). Each processor core includes one or more instruction pipelines including a corresponding fetch stage to fetch instructions, a decode stage to decode each fetched instruction into one or mode corresponding operations, and one or more execution units to execute the operations. In some embodiments, one or more of the processor cores can be dedicated to manipulation and processing of special types of data. For example, one or more of the processor cores can be graphics processing units (GPUs) dedicated to manipulation and processing of graphics data.

To assist the processor cores in executing instructions, the processor 100 includes, for each processor core, a corresponding level 1 ("L1") cache and TLB. For example, the processor core 101 is associated with the L1 cache 103 and TLB 104, while the processor core 102 is associated with the L1 cache 105 and the TLB 106. Each L1 cache is employed data (e.g., instructions, operand data) likely to be used by the associated processor core in the near future. Each TLB is employed to store address translation information (e.g., virtual memory addresses and corresponding physical memory addresses) likely to be used by the associated processor core in the near future.

In addition, the processor 100 includes a number of resources shared between two or more of the processor cores, including an L2 cache 107, L3 cache 108, a memory controller 110, and a memory 112. The L2 cache 107 stores data for multiple processor cores that is likely to be used by one or more of the processor cores in the near future, wherein the set of data stored at the L2 cache 107 is a superset of the data stored at the L1 caches. Similarly, the L3 cache 108 stores a superset of the data stored at the L2 cache 107. That is, the L3 cache stores copies of the data stored at the L2 cache and additional data not stored at the L2 cache 107 that is likely to be used by one or more of the processor cores. The memory 112 represents the system memory for the processor 100, and stores a superset of the data stored at the L3 cache 108, including additional data retrieved from one or more non-volatile storage devices (not shown at FIG. 1). It will be appreciated that the memory 112 is illustrated as a portion of the processor 100 for purposes of description, but that in some embodiments the memory 112, or some portions thereof, may be external to the processor 100 (e.g., formed in a separate semiconductor die and connected to the processor 100 via one or more external signal lines).

The memory 112, L3 cache 108, L2 cache 107, and L1 caches 103 and 105 collectively form a memory hierarchy for the processor 100. For purposes of description, the memory 112 is referred to as the highest level of the memory hierarchy, the L3 cache 108 as the next-highest level, the L2 cache as the next-highest level to the L3 cache 108, and the L1 caches are referred to as the lowest level of the memory hierarchy. To enhance processing efficiency (e.g., speed of execution of programs at the processor cores) the processor 100 transfers data among the levels of the memory hierarchy so that the lowest level of the hierarchy (the L1 caches) stores data predicted as most likely to be accessed by the corresponding processor core in the near future, with each higher level storing both the data stored at the next-lower level of the memory hierarchy and additional data that is predicted as likely to be accessed by one or more of the processor cores, but predicted as less likely to be accessed than the data stored in the next-lower level of the memory hierarchy. This ensures that, as the predicted likelihood that a particular unit of data is to be accessed increases, that data is moved closer in the memory hierarchy to the corresponding processor core, reducing access speed for the data and improving processor efficiency. The predicted likelihood of access for the data can be based on the data itself being accessed, based on observed patterns of accesses, and the like. In some embodiments, a given level of the memory hierarchy may store data that is not stored at the next-higher level of the memory hierarchy. That is, in some embodiments one or more portions of the memory hierarchy may be exclusive or non-inclusive with respect to higher levels of the memory hierarchy.

As a consequence of data being moved into a given level of the memory hierarchy of the processor 100, other data must sometimes be evicted from the memory hierarchy level to make room for the data being moved in. The movement of data between levels of the memory hierarchy and selection of data for eviction resulting from this movement is generally referred to as "data management" or "managing data" at the processor 100. To facilitate data management, the processor 100 can execute an operating system (OS) 113 that implements memory paging for executing programs. To do so, the OS assigns an executing program contiguous memory spaces, referred to as memory pages, in a virtual address space. To access data, the executing program generates a memory access request (e.g., a read request or a write request) including the virtual address of the data targeted by the memory access request. The OS 113 maintains a set of page tables (e.g., page table 114) that map virtual addresses to the physical address of the memory page that stores the data. The OS 113 uses the page tables to translate the virtual address of a memory access request to its corresponding physical address, and provides the physical address and memory access request to the memory controller 110, which executes the memory access request at the memory hierarchy of the processor 100.

The processor 100 employs the TLBs to assist in translation of virtual addresses to physical addresses. In particular, each TLB stores, for its corresponding processor core, the virtual addresses and corresponding physical addresses for the most recent memory access requests generated at the corresponding processor core. In response to a memory access request, the processor identifies whether the virtual address of the request is stored at an entry of the corresponding TLB and if so (a "TLB hit") translates the virtual address to the physical address indicated by the entry. If the TLB does not store the virtual address (a "TLB miss"), the OS accesses the page tables (referred to as a "table walk") to identify the physical address for the virtual address. The processor 100 also transfers the virtual and physical address to an entry of the TLB.

In the course of executing program instructions, the cores of the processor 100 generate requests to access data, referred to as memory access requests. Examples of memory access requests include read access requests, representing requests to read data into a register of a processor core, and write access requests, representing requests to write data from a register of the processor core to memory. Each memory access request includes the virtual address of the memory location targeted by the request. The memory access request can include additional information such as, in the case of write access requests, the data to be written (referred to as the write data) to the memory location.

In response to a memory access request, the processor 100 employs the TLBs and page tables to translate the virtual address of the memory request to a physical address, as described above. The memory controller 110 then uses the physical address to satisfy the memory access request at the memory hierarchy of the processor 100. In particular, each of the caches (e.g., L1 caches 103 and 105, L2 cache 107, and L3 cache 108) includes a set of storage locations, and each storage location is assigned the physical address for the data stored at that location. In some embodiments, the physical address for the data at each storage location corresponds to the physical address of the memory location of the memory 112 that stores the data. Starting with the L1 cache of the processor core that generated the memory access request, the memory controller 110 identifies whether the cache has a storage location that has been assigned the physical address corresponding to the memory access request. If so, a cache hit is indicated and the memory controller satisfies the memory access request at the storage location of the L1 cache. If the L1 cache does not have a storage location that has been assigned the physical address corresponding to the memory access request, a cache miss is indicated and the memory controller proceeds to the L2 cache 107.

In similar fashion to the L1 cache, the memory controller 110 determines a cache miss or cache hit at the L2 cache 107 based on the physical address. In the case of a cache hit, the memory controller 110 copies the data corresponding to the physical address from the L2 cache 107 to the L1 cache and satisfies the memory access request at the L1 cache. In response to a cache miss, the memory controller 110 proceeds to the L3 cache 108 and identifies a cache hit or cache miss. In the event of a cache hit, the memory controller 110 copies the data corresponding to the physical address from the L3 cache 108 to the L2 cache 107 and the L1 cache and satisfies the memory access request at the L1 cache. In the event of a cache miss, the memory controller 110 retrieves the data corresponding to the physical address from the memory 112 and copies the data to each of the L3 cache 108, the L2 cache 107, and the L1 cache, and satisfies the memory access request at the L1 cache.

The above process of locating data responsive to a memory access request at the memory 112, the L3 cache 108, the L2 cache 107, and the L1 cache is referred to as traversing the memory hierarchy of the processor 100. Traversing the memory hierarchy imposes a performance penalty on the program that generated the memory access request, with the size of the penalty growing as the data is located further from the processor core in the memory hierarchy (so that the greatest penalty is experienced when the data targeted by the memory access request is located only at the memory 112). To reduce the performance penalty, the processor 100 and a driver, illustrated as PMC driver 125, together implement one or more memory management schemes to move data that is predicted to be frequently accessed data closer in the memory hierarchy to the processor cores predicted to access the data in the near future. To facilitate these memory management schemes, the processor 100 includes a miss stream record module 109 and an address translation record module 111.

The miss stream record module 109 is configured to record cache misses at one or more of the caches 103, 105, 107, and 108. For purposes of description, it is assumed that FIG. 1 reflects one or more embodiments wherein the miss stream record module 109 records cache misses at the L3 cache 108, as those cache misses result in the largest performance penalty. However, in other embodiments the miss stream record module 109 can record cache misses at other caches of the processor 100.

The miss stream record module 109 records the cache misses at an access log 115. The access log 115 includes a plurality of storage locations, with each storage location corresponding to an entry of the log. In response to a cache miss at the L3 cache 108, the miss stream record module 109 selects an entry at the access log 115 and stores data representing the cache miss at the selected entry. In some embodiments, the data representing the cache miss includes the physical address of the memory access request that triggered the cache miss and the type (e.g., read access or write access) of the memory access request. To select the entry for storing information associated with a cache miss, the miss stream record module 109 can implement any of a number of replacement schemes, such as selecting the entry having the oldest cache miss information for replacement. In some embodiments, the miss stream record module 109 does not record every cache miss, but instead periodically records cache misses according to a programmable or fixed schedule. For example, in some embodiments the miss stream record module records every $20^{th}$ cache miss at the access log 115. In some embodiments, the access log 115 can be spatially compressed, such that each entry of the log corresponds to a region of virtual or physical addresses.

In some embodiments, accesses to one or more memory pages may be excluded from being recorded as cache misses at the access log 115. For example, a page table entry (PTE) of the page table 114 can include a field indicating that the corresponding memory page is excluded from the access log 115. Accordingly, in response to determining a cache miss at the L3 cache resulting from a memory access request, the miss stream record module 109 retrieves the PTE for the physical address of the memory access request. In response to the PTE indicating the memory page for the physical address is excluded, the miss stream record module 109 omits (e.g., does not record an entry for) the corresponding cache miss at the access log 115. If the PTE indicates that the memory page is not excluded, the miss stream record module 109 records the cache miss at an entry of the access log 115. In some embodiments, the miss stream record module 109 can record entries for cache misses associated with excluded memory pages at the access log 115, and subsequently filter those entries to remove them from the log.

In some embodiments, the processor 100 provides the access log 115 to the PMC driver 125, which uses the cache miss information contained therein for data management purposes. For example, in some scenarios it is advantageous for the PMC driver 125 to place memory pages having frequently accessed data at the L3 cache 108. The OS 113 can analyze the access log 115 to identify memory accesses to a memory page that resulted in a cache miss, referred to for purposes of description as "cache miss accesses". If the number of cache miss accesses to a memory page exceeds a threshold amount, the PMC driver 125 can request the memory controller 110 to transfer the memory page to the L3 cache 108. In response, the memory controller 110 transfers the data at the memory locations of the memory 112 corresponding to the memory page to the L3 cache 108, thereby reducing access times to the frequently accessed data and improving processing efficiency.

As indicated above, the access log 115 stores physical addresses of the cache miss requests. However, the data management schemes implemented by the PMC driver 125 are sometimes tailored to virtual address spaces. Accordingly, to facilitate data management the processor 100 includes an address translation record module 111 configured to store mappings of physical addresses to virtual addresses at an address translation log 116. In particular, the address translation log 116 includes a set of entries. In response to a page walk that translates a virtual address to a physical address, the address translation record module 111 selects an entry of the address translation log 116 and stores the physical address, as indicated by the page walk, and corresponding physical address at the selected entry. To select the entry the address translation record module can implement any of a number of replacement schemes, such as selecting the entry having the oldest address translation information for replacement.

In some embodiments, different programs executing at the processor cores of the processor 100 employ different virtual address spaces, and therefore different mappings between virtual addresses and physical addresses. Accordingly, in response to a context switch at a processor core, wherein one program executing at the processor core is replaced by another program, the TLB of the corresponding processor core is flushed to remove the virtual-to-physical address translations for the exiting program. The TLB flush can also be recorded at the address translation log 116 to indicate that some or all of the entries of the log recorded prior to the flush may store physical-to-virtual address mappings that are not valid for the currently executing program, and therefore should not be used for data management. Similarly, invalidation of a particular TLB entry can be recorded at the address translation log 116 to indicate that a corresponding entry of the log recorded prior to the invalidation should be flushed in response to a subsequent flush request.

In operation, a program executes at one or more of the processor cores of the processor 100. In the course of executing the program, the one or more processor cores generate memory access requests, which in turn generate page walks to translate the virtual addresses of the memory access requests to physical addresses. The address translation record module 111 stores these translations at entries of the address translation log 116. In addition, the translations are provided to the TLBs of the one or more processor cores executing the program. In addition, the memory access requests generate a series of cache misses, referred to as a cache miss stream, at the L3 cache 108. The miss stream record module periodically samples the cache miss stream to store cache miss information at entries of the access log 115.

Periodically or in response to a specified event, such as the number of entries at the access log 115 exceeding a threshold, the processor 100 provides an indication (e.g., via a trap or interrupt) to the PMC driver 125. In response to the indication, the PMC driver 125 accesses the access log 115. The PMC driver 125 uses the address translation log 116 to translate the physical addresses of the entries of the access log 115 to corresponding virtual addresses. The PMC driver 125 then analyzes the resulting cache miss information (with the virtual addresses) to identify patterns in the cache miss accesses indicated by the access log 115. Based on these patterns, the PMC driver 125 identifies one or more blocks of data (e.g., memory pages) at the memory 112 to transfer to the L3 cache 108. In some embodiments, instead of or in addition to transferring data to the L3 cache 108, the PMC driver 125 can transfer data between memory modules of the memory 112 based on the identified patterns. For example, in some embodiments the memory 112 can include memory modules of different types, with some types more efficiently or quickly accessed by selected processor cores. Based on identified patterns in the access log 115, the PMC driver 125 can transfer data from a memory module of one type to a memory module of a different type in order to allow a given processor core to access the data more efficiently.

FIG. 2 illustrates a block diagram of the access log 115 in accordance with some embodiments. In the illustrated example, the access log 115 includes a plurality of entries (e.g., entry 232) with each entry including a physical address field 230 and a request type field 231. The physical address field 230 indicates the physical address corresponding to the cache miss request for the entry, and the request type field 231 indicates the type of memory access request (e.g., read access request or write access request) for the entry. The information in the physical address fields of the entries can be used by the PMC driver 125 (either in physical address form or translated to virtual addresses based on the address translation log) to identify patterns in the cache miss stream for data management purposes. The information in the request type fields of the entries can also be used by t the PMC driver 125 to further refine the pattern identification. For example, in some scenarios it may be beneficial to prioritize frequently written data for storage at the L3 cache 108 over frequently read data that is not written. The PMC driver 125 can use the request type fields to identify frequently written data in the cache miss stream, and manage data at the memory hierarchy based on the identification. For example, the PMC driver 125 can move frequently written data to the L3 cache 108.

FIG. 3 illustrates a block diagram of the address translation log 116 in accordance with some embodiments. The address translation log 116 includes a plurality of entries (e.g., entries 342-348) with each entry including a type field 339, a virtual address field 340, and a physical address field 341. The type field 339 indicates the type of the entry, including whether the entry corresponds to an address translation, a TLB flush, or an invalidation of an entry of the TLB. The virtual address field 340 indicates a virtual address and the physical address field 341 indicates a corresponding physical address, as indicated by a page table corresponding to the program that caused recording of the entry. One or more of the entries, such as entry 347, can correspond to a TLB flush at a TLB of the processor core, with the fields of the entry indicating the TLB flush and other information such as an identifier of the TLB that was flushed. Other entries, such as entries 344 and 345, can correspond to invalidation of a TLB entry, with the virtual address field 341 indicating the virtual address corresponding to the invalidated entry.

The PMC driver 125 employs the entries of the address translation log 116 to identify the virtual addresses corresponding to the physical addresses of the entries of the access log 115, in order to identify access patterns in the virtual addresses. The PMC driver 125 can use the TLB flush entries (e.g., entry 343) to identify the virtual addresses that are no longer being used by the currently executing program. That is, a TLB flush entry is a marker that indicates that virtual addresses corresponding to TLB invalidated entries, such as entries 344 and 345 store outdated information, and should not be used by the OS 113 in its analysis of the access log 115.

Figure 4:
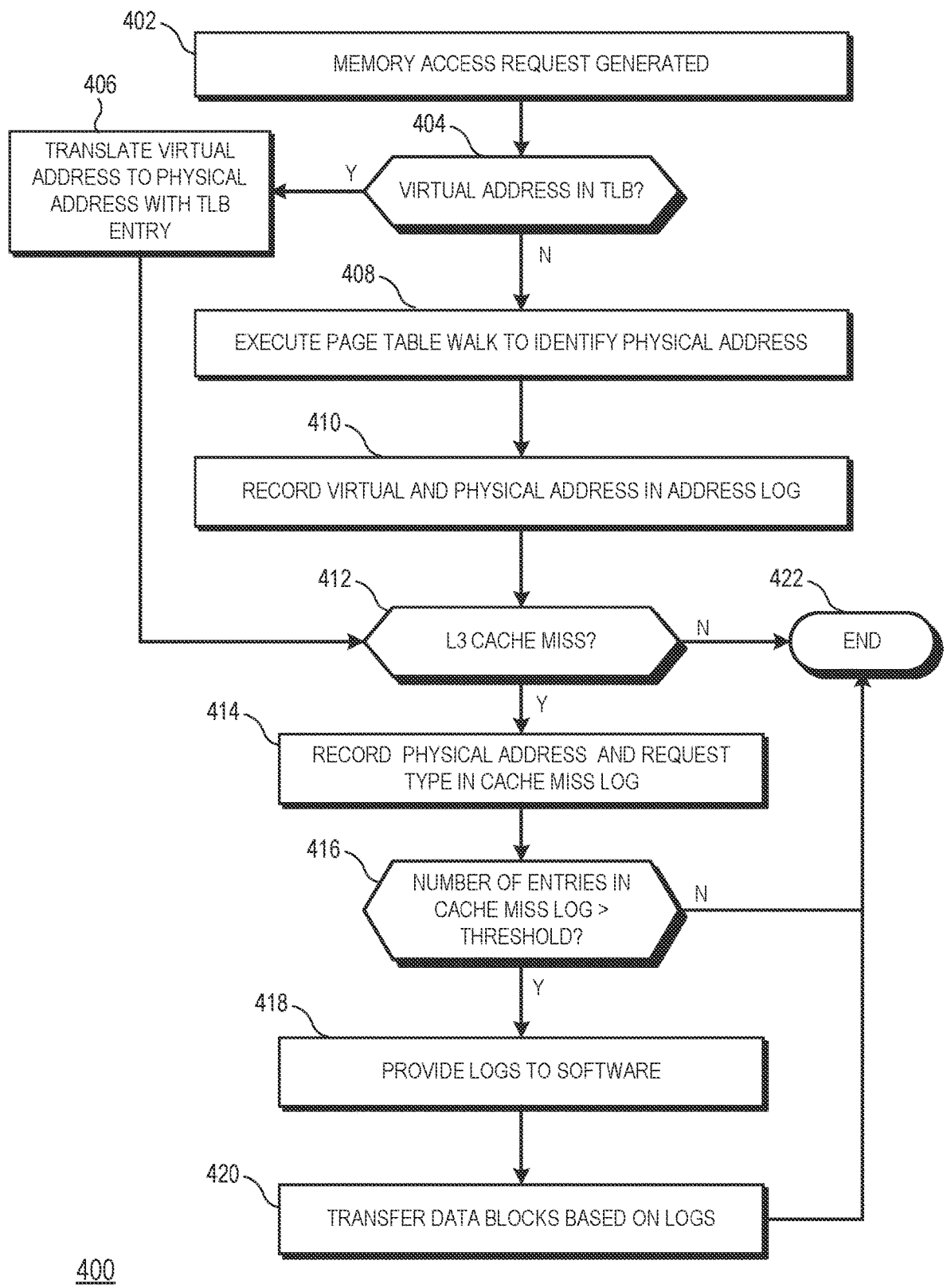
FIG. 4 is a flow diagram of a method of maintaining a log of indicating cache misses and a corresponding log that indicates virtual-to-physical address mappings in order to support software memory management in accordance with some embodiments.

FIG. 4 illustrates a flow diagram of a method 400 of maintaining a log of indicating cache misses and a corresponding log that indicates virtual-to-physical address mappings in order to support software memory management in accordance with some embodiments. At block 402 a processor core of the processor 100 generates a memory access request. At block 404, the TLB of the processor core determines whether it stores a physical address for the virtual address of the memory access request. If so, the method flow moves to block 406 and the TLB translates the virtual address of the memory access request to its corresponding physical address. The method flow proceeds to block 412, described below.

Returning to block 404, if the TLB does not store a physical address for the virtual address of the memory access request, the method flow moves to block 408 and the OS 113 performs a page table walk to identify the physical address. At block 410 the address translation record module records the physical address and the corresponding virtual address at an entry of the address translation log 116.

At block 412 the miss stream record module 109 determines whether the memory access request generated at block 402 results in a cache miss at the L3 cache 108. If not, the method flow moves to block 422 and the method ends. If, at block 412, the miss stream record module 109 determines that the memory access request generated at block 402 does result in a cache miss, the method flow moves to block 414 and the miss stream record module records the physical address and memory access request type of the memory access request at an entry of the access log 115. The method flow proceeds to block 416 and the miss stream record module 109 determines whether the number of entries of the access log 115 exceeds a threshold. If not, the method flow moves to block 422 and the method ends.

If, at block 416, the miss stream record module 109 determines that the number of entries of the access log 115 exceeds the threshold, the method flow moves to block 418 and the processor 100 provides the access log 115 and the address translation log 116 to the PMC driver 125. At block 420 the OS 113 uses the information in the address translation log 116 to translate the physical addresses of the entries of the access log 115 to virtual addresses. The PMC driver 125 then identifies patterns in the memory accesses indicated by the entries of the access log 115, and transfers blocks of data from the memory 112 to the L3 cache 108 based on the identified patterns. The method flow proceeds to block 422 and the method ends.

In some embodiments, the apparatus and techniques described above are implemented in a system comprising one or more integrated circuit (IC) devices (also referred to as integrated circuit packages or microchips), such as the processor described above with reference to FIGS. 1-4. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   recording, at a processor, a first log indicating a set of physical memory addresses associated with a stream of cache misses at the processor;
   providing the first log to an operating system executing at the processor; and
   transferring data to a first cache based on the first log.

2. The method of claim 1, further comprising:
   recording, at the processor, a second log indicating a mapping of the set of physical memory addresses to a corresponding set of virtual addresses; and
   providing the second log to the operating system executing at the processor,
   wherein transferring data to the first cache comprises transferring data based on the second log.

3. The method of claim 2, wherein providing the first log and the second log comprises:
   providing the first log and the second log to the operating system in response to a number of physical memory addresses in the set of physical memory addresses exceeding a threshold.

4. The method of claim 1, further comprising:
   identifying a memory access pattern based on the first log.

5. The method of claim 4, wherein transferring data comprises transferring data based on the memory access pattern.

6. The method of claim 1, further comprising:
   transferring data from a first memory module to a second memory module based on the first log.

7. The method of claim 1, further comprising:
in response to a memory access request resulting in a cache miss, omitting a physical address of the memory access request from the first log in response to determining the physical address is located in an excluded region of memory.

8. The method of claim 7, further comprising:
determining the physical address is located in the excluded region of memory based on an entry of a page table including the physical address.

9. The method of claim 1, wherein providing the first log comprises:
filtering a physical address from the first log in response to determining the physical address is located in an excluded region of memory.

10. A method, comprising:
periodically sampling, at a processor, a set of physical memory addresses associated with a stream of cache misses at the processor to generate a first log;
recording, at the processor, a second log indicating a mapping of the set of physical memory addresses to a corresponding set of virtual addresses;
providing the first log and the second log to an operating system executing at the processor; and
transferring data to a cache based on the first log and the second log.

11. The method of claim 10, wherein recording the second log comprises:
recording a mapping of a physical address to a corresponding virtual address at the second log in response to a page table walk to identify the physical address.

12. The method of claim 10, wherein providing the first log and the second log comprises:
providing the first log and the second log to the operating system in response to a number of physical memory addresses in the set of physical memory addresses exceeding a threshold.

13. A processor comprising:
a processor core to execute an operating system;
a cache;
a stream recording module to record a first log indicating a set of physical memory addresses associated with a stream of cache misses at the cache and to provide the first log to the operating system; and
a memory controller to transfer data to the cache based on the first log.

14. The processor of claim 13, further comprising
an address recording module to record a second log indicating a mapping of the set of physical memory addresses to a corresponding set of virtual addresses and to provide the second log to the operating system, the memory controller to transfer data to the cache further based on the second log.

15. The processor of claim 14, wherein the stream recording module is to provide the first log to the operating system in response to a number of physical memory addresses in the set of physical memory addresses exceeding a threshold.

16. The processor of claim 14, wherein the first log comprises a plurality of entries, each entry comprising:
a first field indicating a first physical address associated with a memory access request that resulted in a cache miss at the processor; and
a second field indicating a type of the memory access request.

17. The processor of claim 16, further comprising:
a translation lookaside buffer (TLB); and
wherein the address recording module, is to record a TLB flush at the second log, in response to an indication of a flush at the TLB.

18. The processor of claim 16, wherein:
the stream recording module is to omit a second physical address of the memory access request from the first log in response to determining the second physical address is located in an excluded region of memory.

19. The processor of claim 13, wherein:
the processor is to identify a memory access pattern based on the first log.

20. The processor of claim 19, wherein:
the memory controller is to transfer data to the cache based on the memory access pattern.

* * * * *